United States Patent
Chen et al.

(10) Patent No.: US 7,479,724 B2
(45) Date of Patent: *Jan. 20, 2009

(54) STATOR STRUCTURE (75) Inventors: Lee-Long Chen, Taoyuan Hsien (TW); Shih-Wei Huang, Taoyuan Hsien (TW); Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/714,258

(22) Filed: Mar. 6, 2007

(65) Prior Publication Data

US 2007/0159014 A1   Jul. 12, 2007

Related U.S. Application Data (63) Continuation of application No. 10/969,012, filed on Oct. 21, 2004, now Pat. No. 7,196,448.

(30) Foreign Application Priority Data

Apr. 14, 2004   (TW) ............................. 93110302 A (51) Int. Cl.
H02K 1/00 (2006.01)
H02K 1/12 (2006.01)

(52) U.S. Cl. ...................... 310/216; 310/217; 310/218; 310/254

(58) Field of Classification Search ......... 310/216–218, 310/254, 257

See application file for complete search history.

(56) References Cited

U.S. PATENT DOCUMENTS

| 2,701,318 | A |   | 2/1955  | Feiertag          |
|-----------|---|---|---------|-------------------|
| 3,463,955 | A |   | 8/1969  | Scardina et al.   |
| 3,495,113 | A | * | 2/1970  | Haydon ...... 310/164 |
| 3,521,100 | A |   | 7/1970  | Tamm              |
| 4,496,869 | A |   | 1/1985  | Hosoya            |
| 4,775,813 | A | * | 10/1988 | Janson ...... 310/257 |
| 4,851,729 | A |   | 7/1989  | Baines            |
| 4,891,567 | A |   | 1/1990  | Fujitani et al.   |

(Continued)

FOREIGN PATENT DOCUMENTS

JP          355041168 A     9/1978

*Primary Examiner*—Tran Nguyen
(74) *Attorney, Agent, or Firm*—Birch, Stewart, Kolasch & Birch, LLP (57) ABSTRACT

A stator structure includes at least one stator part having a single rolled steel sheet to serve as a waist post with a gap. A first stator part includes a first engaging portion. A second stator part includes a second engaging portion corresponding to the first engaging portion. The first and second stator parts are of the same material. When the first stator part is assembled with the second stator part, the first engaging portion is engaged with the second engaging portion so as to form the stator structure with a waist post.

15 Claims, 9 Drawing Sheets

U.S. PATENT DOCUMENTS

| | | | |
|---|---|---|---|
| 5,457,350 A * | 10/1995 | Sakamaki et al. | 310/216 |
| 5,859,487 A | 1/1999 | Chen | |
| 5,945,765 A | 8/1999 | Chen | |
| 6,285,108 B1 | 9/2001 | Horng | |
| 6,538,357 B2 | 3/2003 | Horng et al. | |
| 6,759,786 B2 * | 7/2004 | Horng et al. | 310/257 |
| 6,847,285 B2 | 1/2005 | Sirois et al. | |
| 6,853,101 B2 * | 2/2005 | Lin et al. | 310/49 R |
| 7,095,142 B2 * | 8/2006 | Leininger | 310/47 |
| 7,196,448 B2 * | 3/2007 | Chen et al. | 310/216 |
| 2004/0036374 A1 * | 2/2004 | Noble et al. | 310/179 |

* cited by examiner

STATOR STRUCTURE

CROSS-REFERENCE TO RELATED APPLICATION

This application is a Continuation of U.S. application Ser. No. 10/969,012, filed on Oct. 21, 2004, which issued as U.S. Pat. No. 7,196,448 on Mar. 27, 2007, and for which priority is claimed under 35 U.S.C. § 120; and this application claims priority of Application No. 093110302, filed in Taiwan, R.O.C. on Apr. 14, 2004, under 35 U.S.C. § 119; the entire contents of all are hereby incorporated by reference.

BACKGROUND OF THE INVENTION

1. Field of the Invention

The present invention relates to a composite stator structure and in particular to a stator structure in a cooling fan.

2. Brief Discussion of the Related Art

Figure 1:
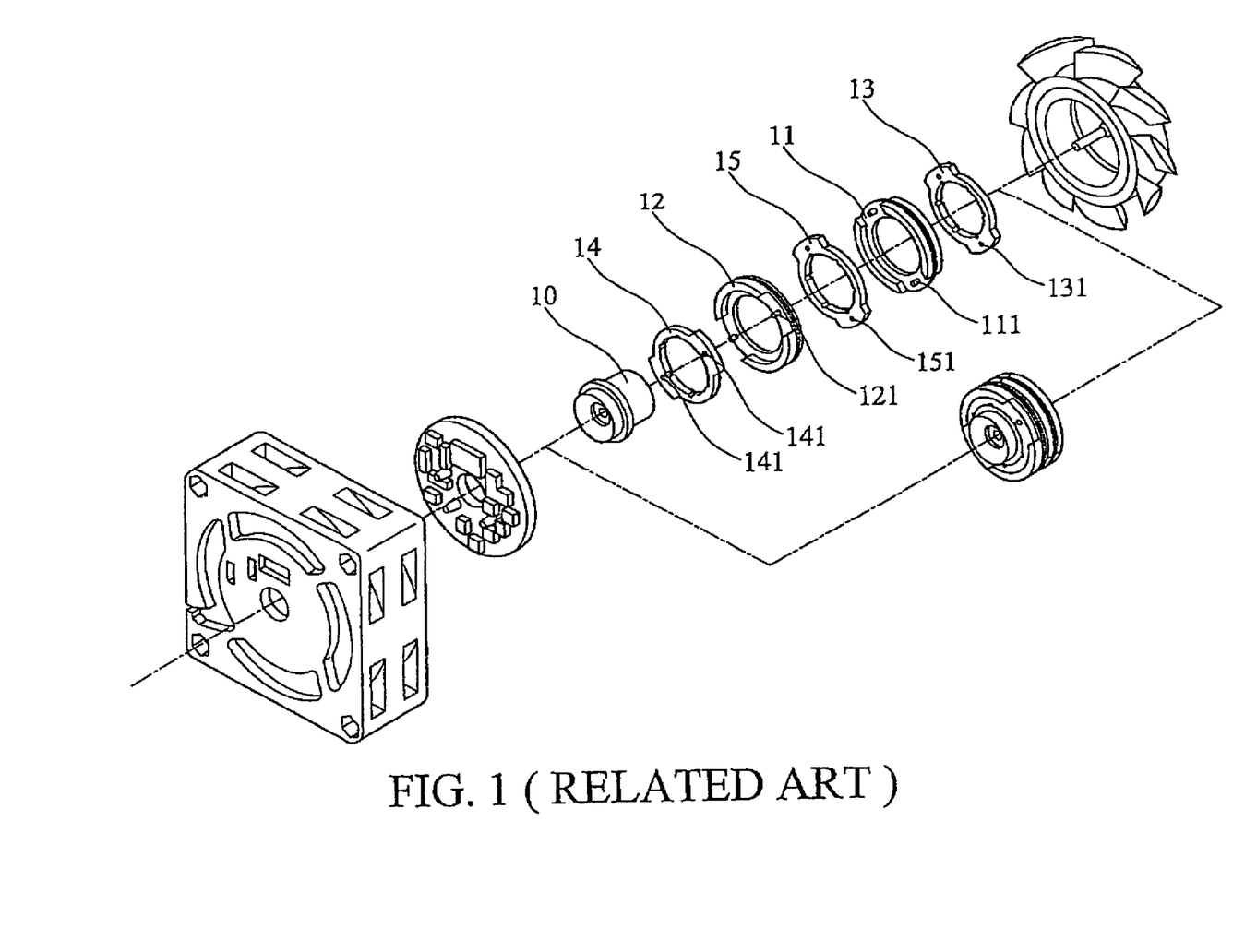
FIG. 1 is an exploded view of a conventional brushless DC fan.

FIG. 1 shows a conventional brushless DC motor. The motor comprises a magnetic sleeve 10, a first bobbin 11, a second bobbin 12, a first pole plate 13, a second pole plate 14, and a third pole plate 15. The second pole plate 14, second bobbin 12, third pole plate 15, first bobbin 11, and first pole plate 13 are sequentially tightly assembled with the magnetic sleeve 10. Protrusions 111 and 121 on the first and second bobbins 11 and 12 must be engaged with the holes 131, 141, and 151 on the first, second, and third pole plates 13, 14, and 15 respectively so as to complete the position and angle of the first, second and third pole plates 13, 14, and 15. However, the first and second bobbins 11 and 12 are made of plastic, and the first, second and third pole plates 13, 14 and 15 are tightly telescoped to the magnetic sleeve 10, they are uneasily pressed to the precise angle and depth, thereby causing the inconvenience of the manufacturing process. Further, the magnetic sleeve 10 can not be formed by punching in one time, which must be turned off inwardly and outwardly so that it will increase the difficulty and cost of manufacturing process. Moreover, the material of the magnetic sleeve 10 is different from those of the first, second, and third pole plates 13, 14, and 15 such that it will increase the magnetic resistance and a lot of heat and easily cause the residually magnetic phenomenon and worse magnetic loop.

SUMMARY OF THE INVENTION

An object of the invention is to provide a stator structure with reduced size, easily manufactured, and improved magnetic characteristics in a cooling fan.

Another object of the invention is to provide a stator structure which is integral formed with same material, assembling rapidly and locating precisely.

Embodiments of a stator structure comprise a first stator part and a second stator part. The first stator part comprises a first engaging portion, and the second stator part comprises a second engaging portion corresponding to the first engaging portion. The first and second stator parts are of the same material. When the first stator part connects to the second stator part, the first engaging portion connects to the second engaging portion to form a waist post.

Preferably, the first and second stator parts further comprise a plurality of salients, respectively, extending horizontally outward with respect to an axial line of the waist post. Further, The first engaging portion has a recess and the second engaging portion has a protrusion corresponding to the recess.

The first and second stator parts may further comprise a plurality of upper and lower salients, respectively, formed on two opposite ends of the first and second engaging portions. The upper salients of the first and second stator parts are located on a plane. The lower salients of the first and second stator parts are located on another plane. The upper salients and the lower salients are in a staggered arrangement.

Preferably, the first and second stator parts may be formed by the same mold and integrally formed by injection molding.

The first and second stator parts may further comprise a plurality of projections extending out from a fringe thereof, respectively.

The stator structure may further comprise a third stator part connected to ends of the first and second stator parts. The third stator part may be constructed by one or more silicon steel piece comprising an opening, an inner surface in the opening, and a plurality of notches formed on the inner surface, and the projections extend through the notches out of the opening and are bent outwards.

Otherwise, the stator structure may further comprise a third stator part and a fourth stator part connected to ends of the first and second stator parts, respectively. The third and fourth stator parts may be formed by the same mold and integrally formed by injection molding, or may be constructed by one or more silicon steel piece stacked.

The stator structure may further comprise an insulation layer covered the stator structure, or a bobbin disposed on the waist post so that a coil is wound thereon.

The invention also provides a stator structure comprising a first stator part and a second stator part. The first stator part is formed by rolling a single silicon steel sheet to form a waist post. The second stator part is constructed by one or more silicon steel piece stacked. The second stator part connects to at least one end of the first stator part.

The first stator part may comprise a plurality of salients extending horizontally outward with respect to an axial line of the waist post. A gap extending parallel to the axial direction of the waist post is formed.

The first stator part may comprise a plurality of projections extending out from a fringe thereof. The second stator part may comprise an opening, an inner surface in the opening, and a plurality of notches formed on the inner surface. The projections extend through the notches out of the opening and are bent outward.

Moreover, the first stator part may comprise a plurality of convexities formed on the waist post according to the notches on the inner surface.

The invention further provides a stator structure comprising a first stator part formed by rolling a single silicon steel sheet and a second stator part formed by rolling another single silicon steel sheet. The first and second stator parts are assembled with each other to form a multi-layer waist post.

The first stator part may comprise a plurality of receiving portions and notches formed on two opposite ends thereof, respectively. The second stator part may comprise a plurality of salients and projections formed on two opposite ends thereof, respectively. When the first stator part is assembled with the second stator part, the salients are coupled to the receiving portions, and the projections pass through the notches and are bent outward.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE PREFERRED EMBODIMENTS

The invention provides a stator structure including a first stator part and a second stator part. The first and second stator parts are made of the same material and coupled together to form the stator structure with a cylindrical waist post. Furthermore, the stator structure may be fabricated by rolling a single silicon steel sheet or telescoping two rolled stator parts.

Figure 2A:
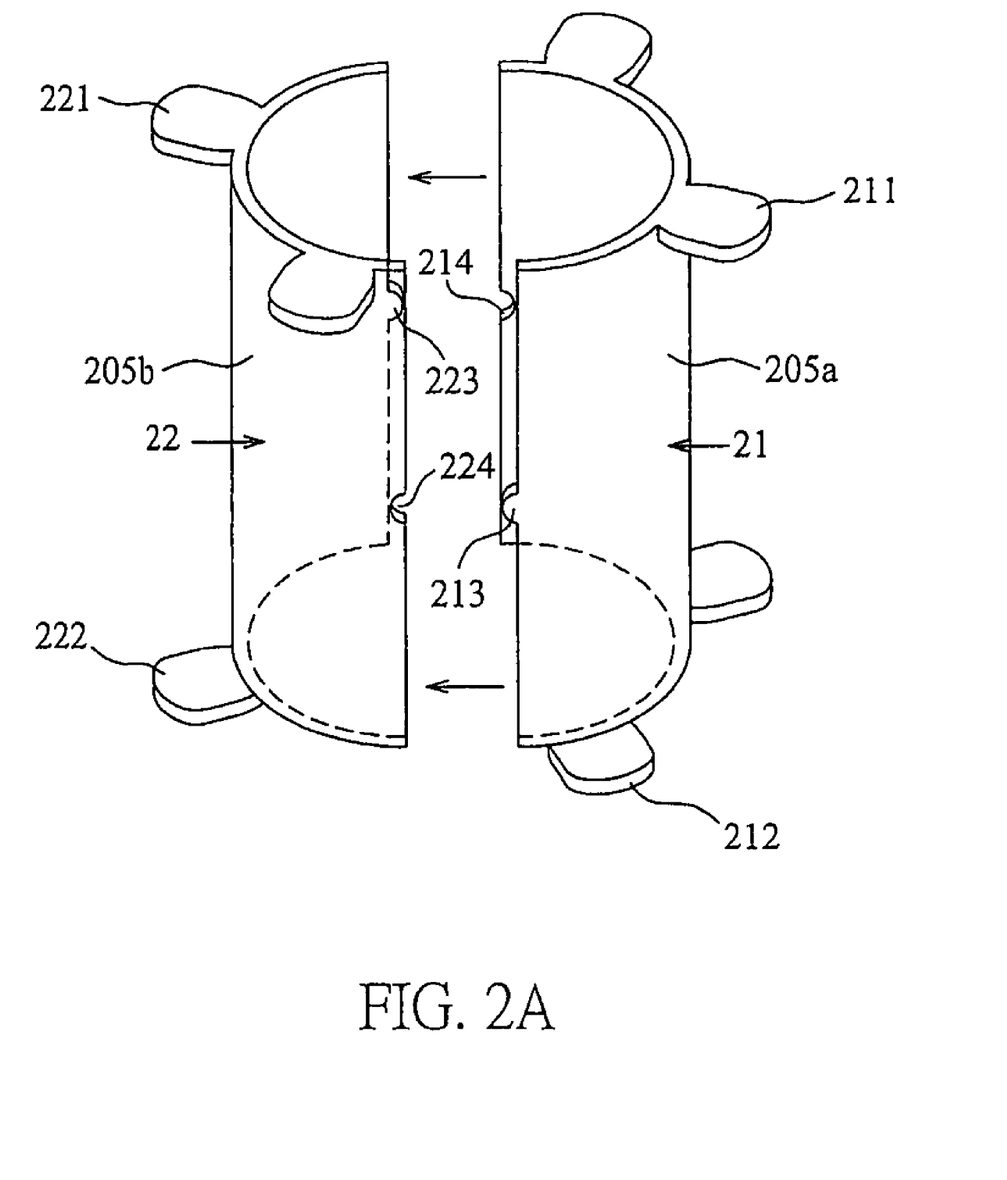
FIG. 2A is a perspective exploded view of a stator structure of a first embodiment of the present invention.

FIG. 2A shows a first embodiment of a stator structure of the invention. The stator structure includes a first stator part 21 and a second stator part 22. The first and second stator parts 21 and 22 may be formed by the same mold, integrally formed by pressing, or be formed by a single silicon steel piece. The first and second stator parts 21 and 22 are shaped to correspond to each other. Upper and lower ends of the first and second stator parts 21 and 22 include a plurality of upper salients 211 and 221 and a plurality of lower salients 212 and 222, respectively. A first connecting portion 205a connects the upper salients 211 and the lower salients 212 to constitute the first stator part 21. A second connecting portion 205b connects the upper salients 221 and the lower salients 222 to construct the second stator part 22. A protrusion 213 and a recess 214 are disposed on two sides of the first connecting portion 205a (except sides with salients), respectively. A protrusion 223 and a recess 224 are disposed on two sides of the second connecting portion 205b (except sides with salients), respectively. When the first stator part 21 is assembled with the second stator part 22, the protrusion 213 and the recess 214 engage the recess 224 and the protrusion 223, respectively, so that the first and second connecting portion 205a and 205b are connected to form a waist post of the stator structure. After assembling, the upper salients 211 of the first stator part 21 and the upper salients 221 of the second stator part 22 are located on a first plane. Similarly, the lower salients 212 of the first stator part 21 and the lower salients 222 of the second stator part 22 are located on a second plane. From the top view, each upper salient 211 is placed between two adjacent lower salients 212 and each upper salient 221 is placed between two adjacent lower salients 222; in other words, the upper salients 211 and 221 and the lower salients 212 and 222 are in a staggered arrangement along the axial direction.

Figure 2B:
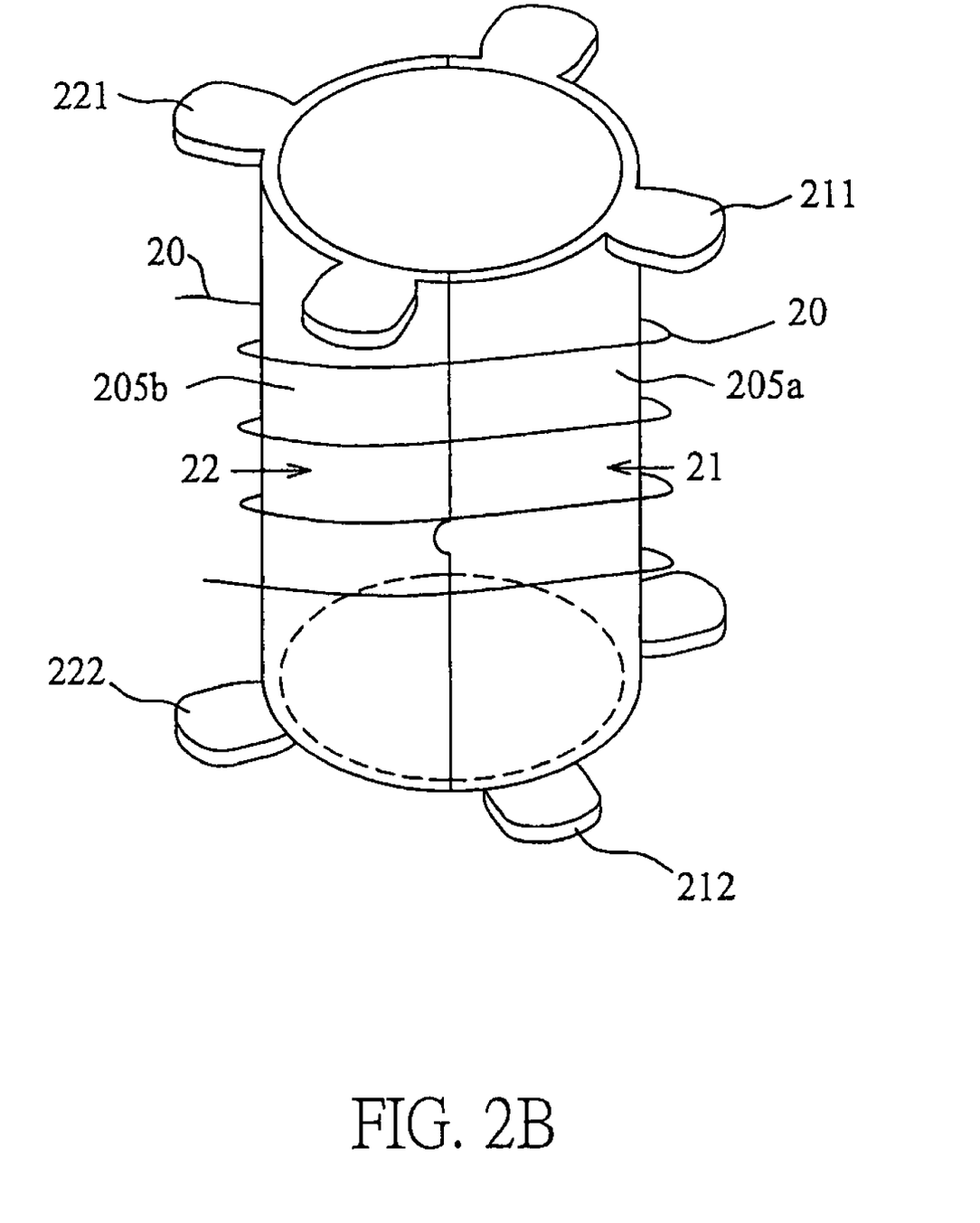
FIG. 2B is the stator structure of FIG. 2A wound with a coil.

An insulator sheathes the first and second stator parts 21 and 22, and coil 20 is wound therearound, as shown in FIG. 2B.

Figure 3:
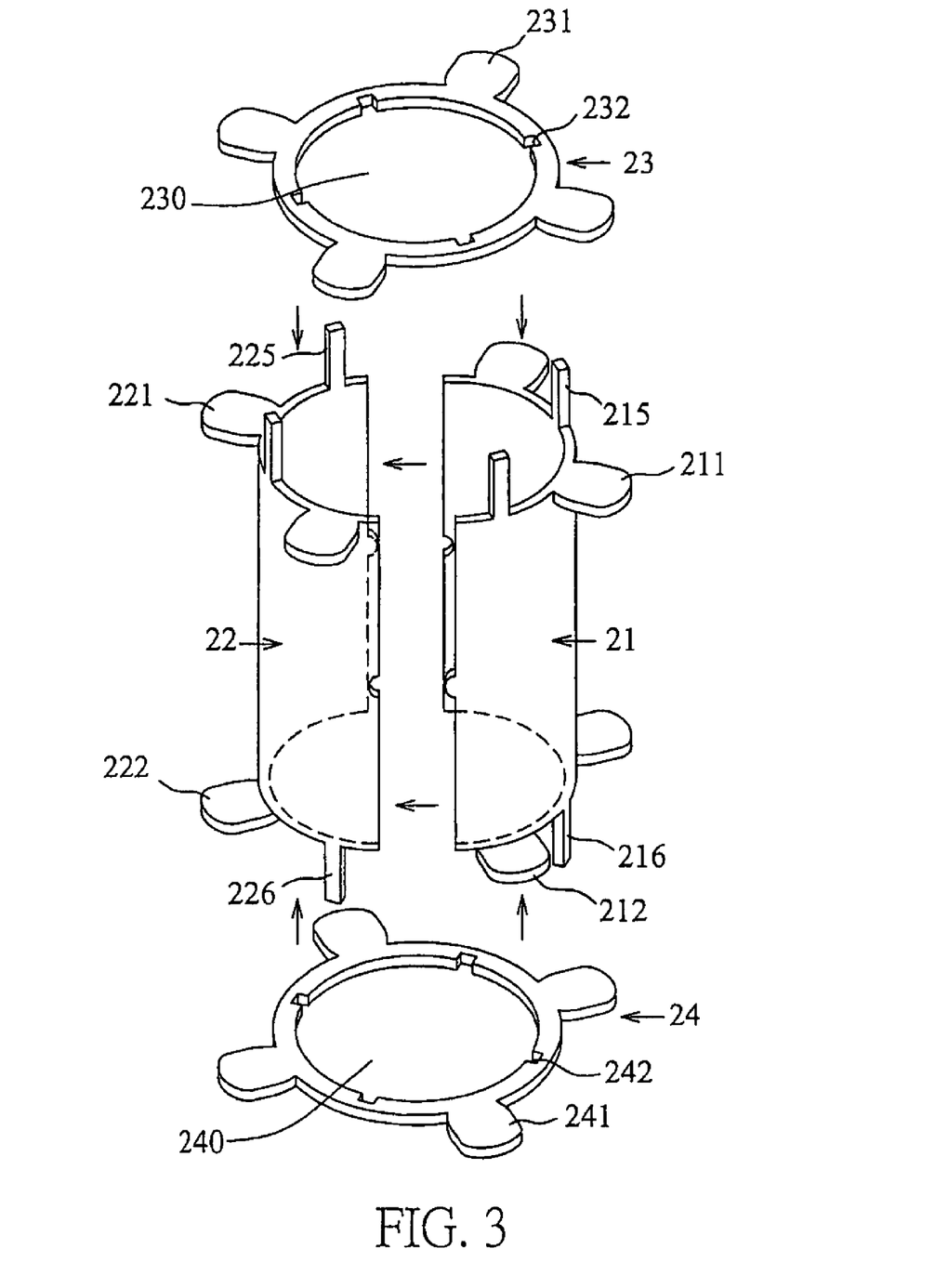
FIG. 3 is a perspective exploded view of a stator structure of a second embodiment of the present invention.

FIG. 3 shows a second embodiment of a stator structure of the invention, which is similar to the first embodiment. The difference from the first embodiments is that the first and second stator parts 21 and 22 further include a plurality of upper projections 215 and 225 and a plurality of lower projections 216 and 226, respectively, for enabling another two stator parts 23 and 24 to telescope thereon. Each stator part 23 and 24 has one or several silicon steel pieces stacked together, increasing conduction area and conducting efficiency. The stator parts 23 and 24 have openings 230 and 240, inner surfaces in the openings 230 and 240, a plurality of notches 232 and 242 formed on the inner surfaces, and a plurality of salients 231 and 241, respectively. The notches 232 and 242 can respectively correspond to the upper projections 215 and 225 and the lower projections 216 and 226. The salients 231 and 241 extend horizontally outward from the openings 230 and 240. When the stator parts 21, 22, 23, and 24 are assembled, the recess 232 and 242 are engaged to the upper projections 215 and 225 and the lower projections 216 and 226 to locate the position. Meanwhile, the salients 231 and 241 are aligned with the upper salients 211 and 221 and the lower salients 212 and 222, respectively. In this embodiment, the stator parts 23 and 24 are fabricated using the same mold, as are the first and second stator parts 21 and 22. Each stator part is a single piece, thereby reducing manufacturing costs. Further, a coil can be wound around the stator structure of FIG. 3, as similar to FIG. 2B.

Figure 4:
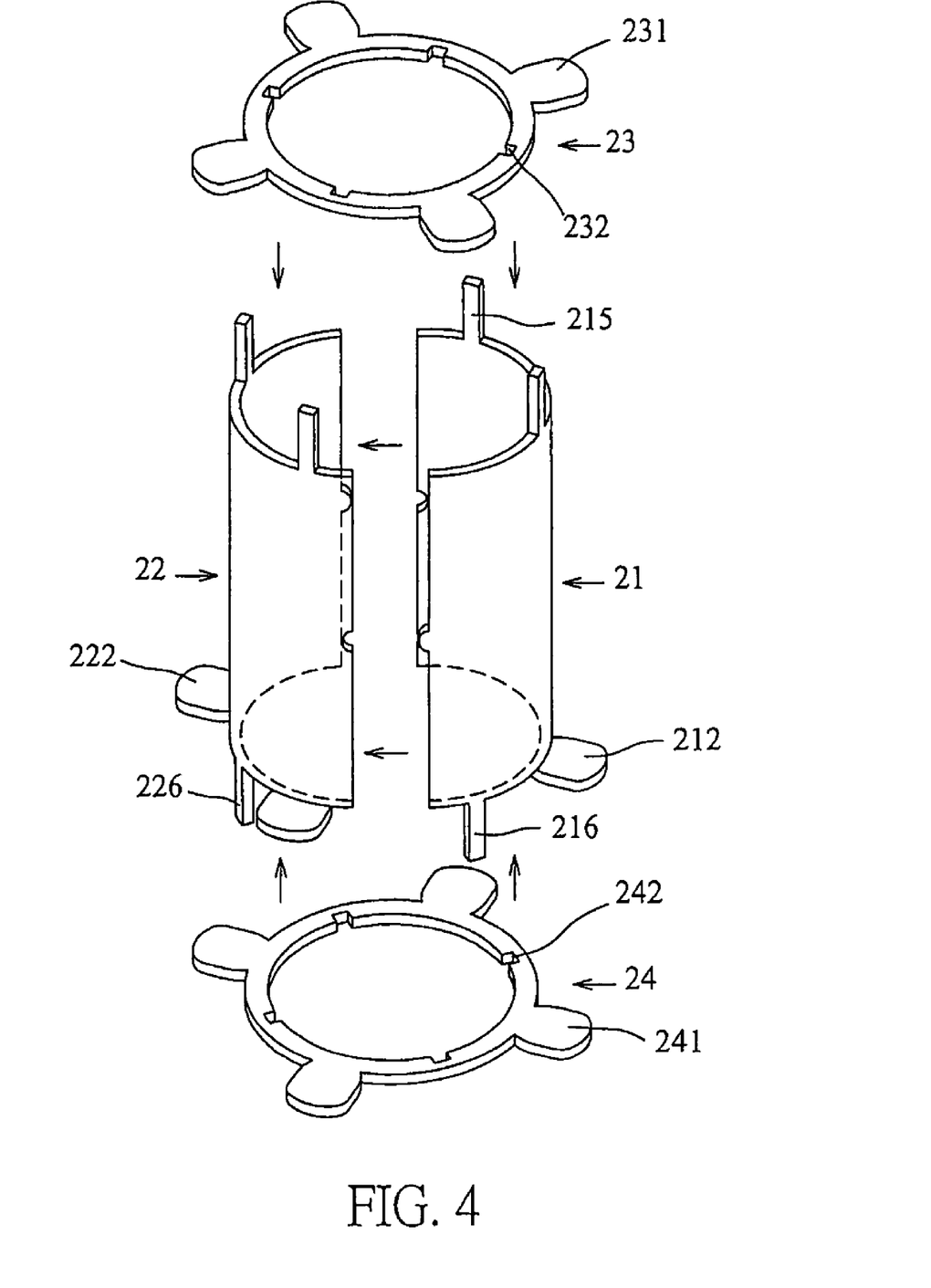
FIG. 4 is a perspective exploded view of a stator structure of a third embodiment of the present invention.

FIG. 4 shows a third embodiment of a stator structure of the invention, which is similar to the second embodiment except that the first and second stator parts 21 and 22 do not require upper salients 211 and 221 such that a bobbin having a coil wound thereon (not shown) can pass therethrough. Therefore, the stator part 23 is assembled with the first and second stator parts 21 and 22 through the engagement between the upper projections 215 and 225 and the notches 232. Further, a coil can be wound around the stator structure of FIG. 4, as similar to FIG. 2B.

Figure 5:
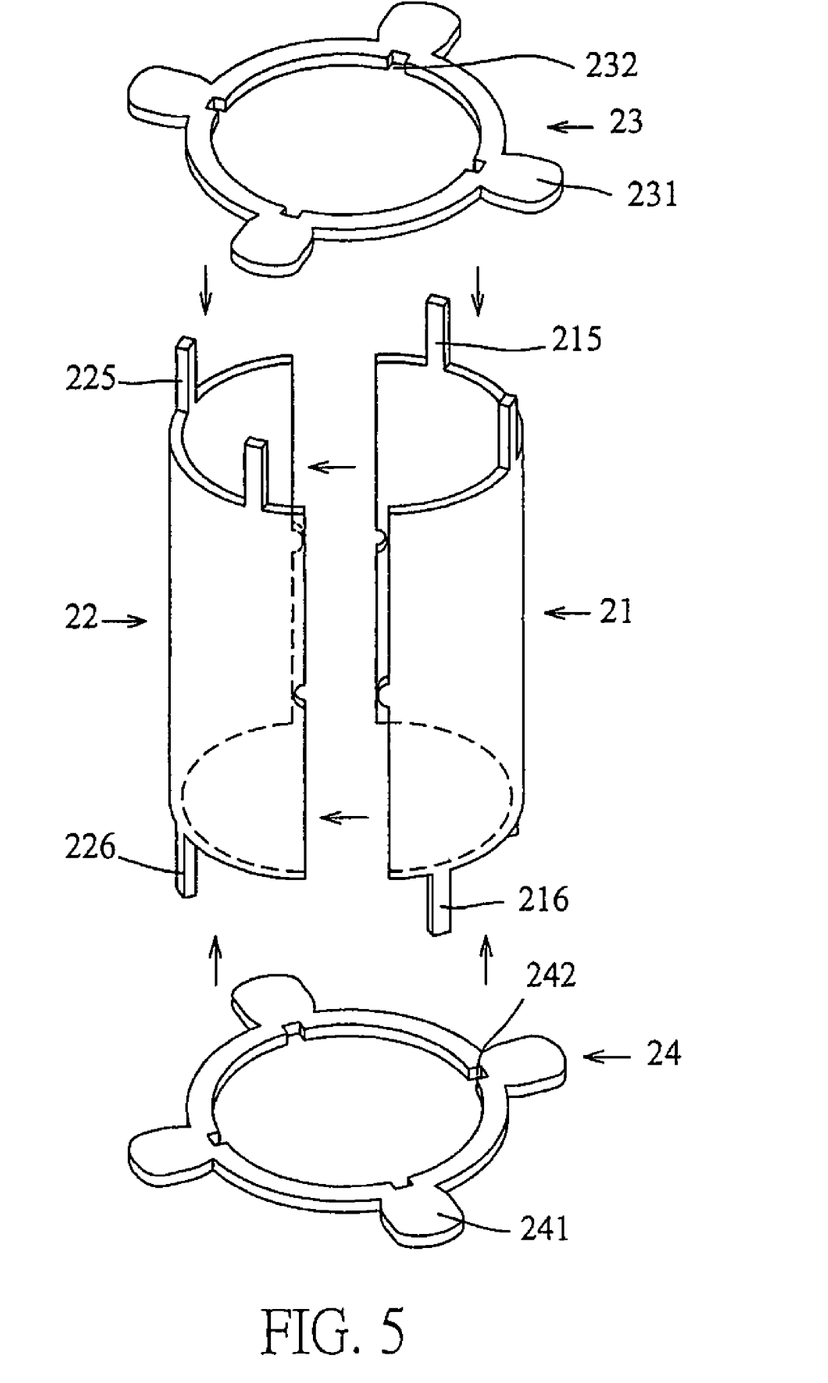
FIG. 5 is a perspective exploded view of a stator structure of a fourth embodiment of the present invention.

FIG. 5 shows a fourth embodiment of a stator structure of the invention, which is similar to the second embodiment expect that the first and second stator parts 21 and 22 do not require upper salients 211 and 221 and lower salients 212 and 222 such that a bobbin having a coil wound thereon (not shown) can pass therethrough. The stator parts 23 and 24 are assembled with the first and second stator parts 21 and 22 by engaging the upper projections 215 and 225 and lower projections 216 and 226 with the notches 232 and 242, respectively. Further, a coil can be wound around the stator structure of FIG. 5, as similar to FIG. 2B.

Figure 6:
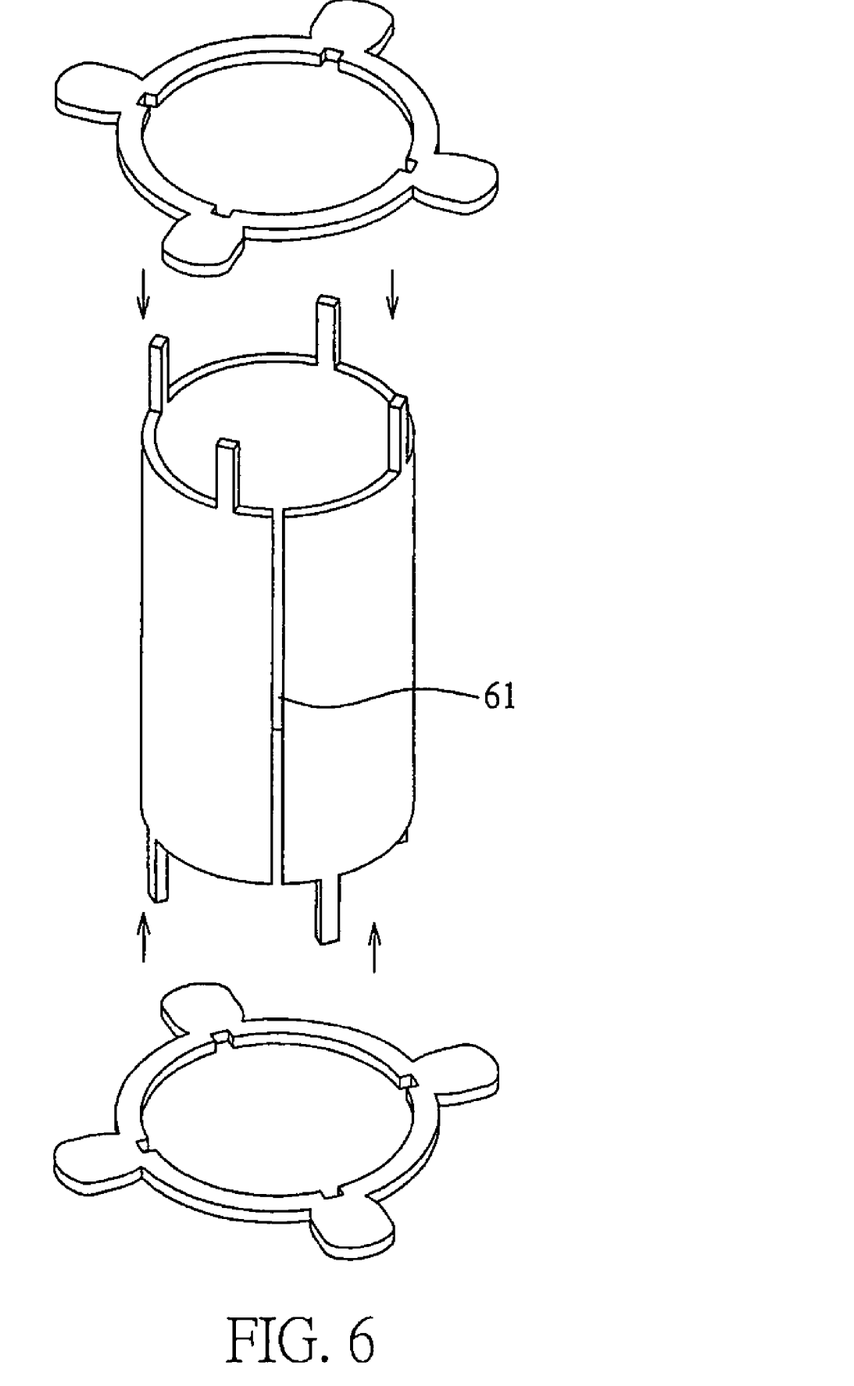
FIG. 6 is a perspective exploded view of a stator structure of a fifth embodiment of the present invention.

FIG. 6 shows a fifth embodiment of a stator structure of the invention, which is similar to the fourth embodiment except that the first and second stator parts 21 and 22 are integrally formed by a single silicon steel sheet, rolled to form a cylindrical waist post of the stator structure. A gap 61 extending parallel to the axial direction of the waist post is formed for preventing eddy current loss. Further, a coil can be wound around the stator structure of FIG. 6, as similar to FIG. 2B.

Figure 7:
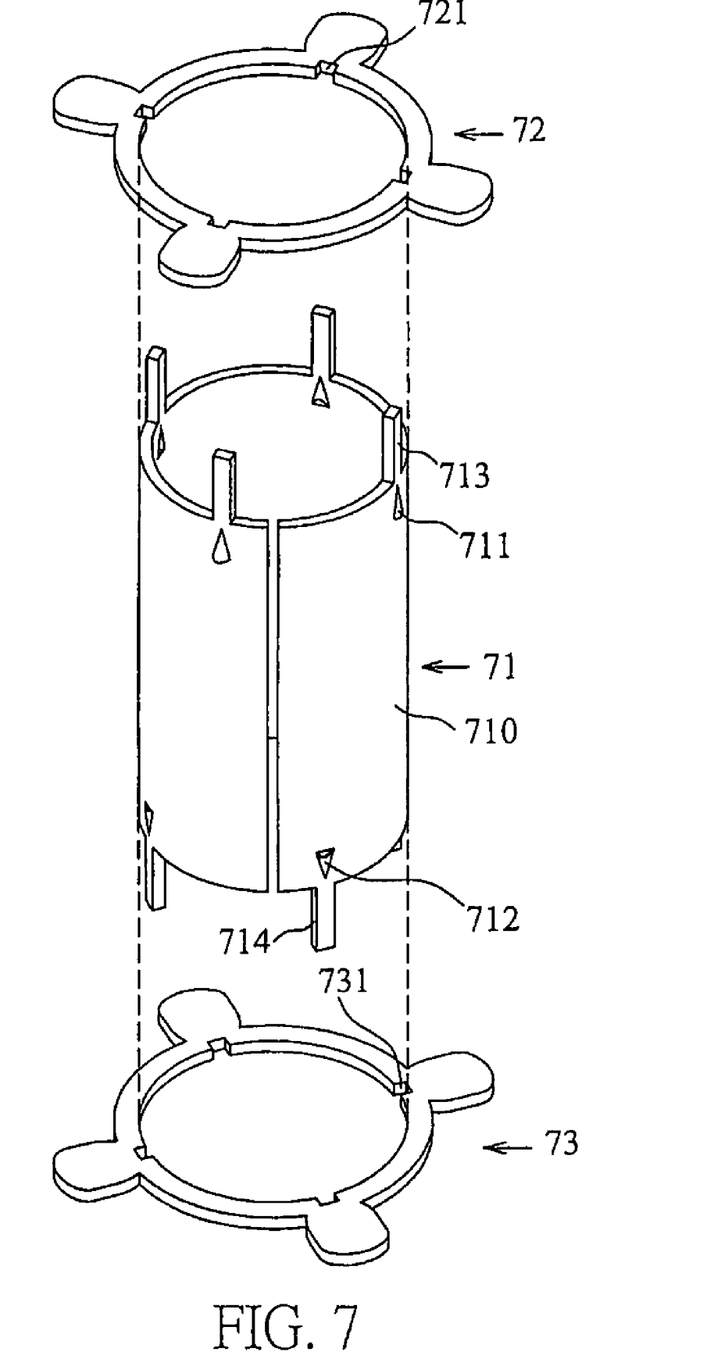
FIG. 7 is a perspective exploded view of a stator structure of a sixth embodiment of the present invention.

FIG. 7 shows a sixth embodiment of a stator structure of the invention, which is similar to the fifth embodiment except that upper and lower ends of the waist post 710 have upper convexities 711 and lower convexities 712, aligned with upper projections 713 and lower projections 714, respectively. The upper and lower convexities 711 and 712 are formed by cutting slots on the waist post 710 and then pressing them outward. Each stator parts 72 and 73 can include one silicon steel piece or a plurality of silicon steel pieces stacked together. The stator parts 72 and 73 further comprise inner surfaces and a plurality of notches 721 and 731 formed thereon. The upper and lower projections 713 and 714 pass through the notches 721 and 731, and the upper and lower convexities 711 and 712 are engaged with the notches 721 and 731. The upper and lower projections 713 and 714 are then bent outward to prevent the stator parts 72 and 73 from separating from the stator part 71. Further, a coil can be wound around the stator structure of FIG. 7, as similar to FIG. 2B.

Figure 8:
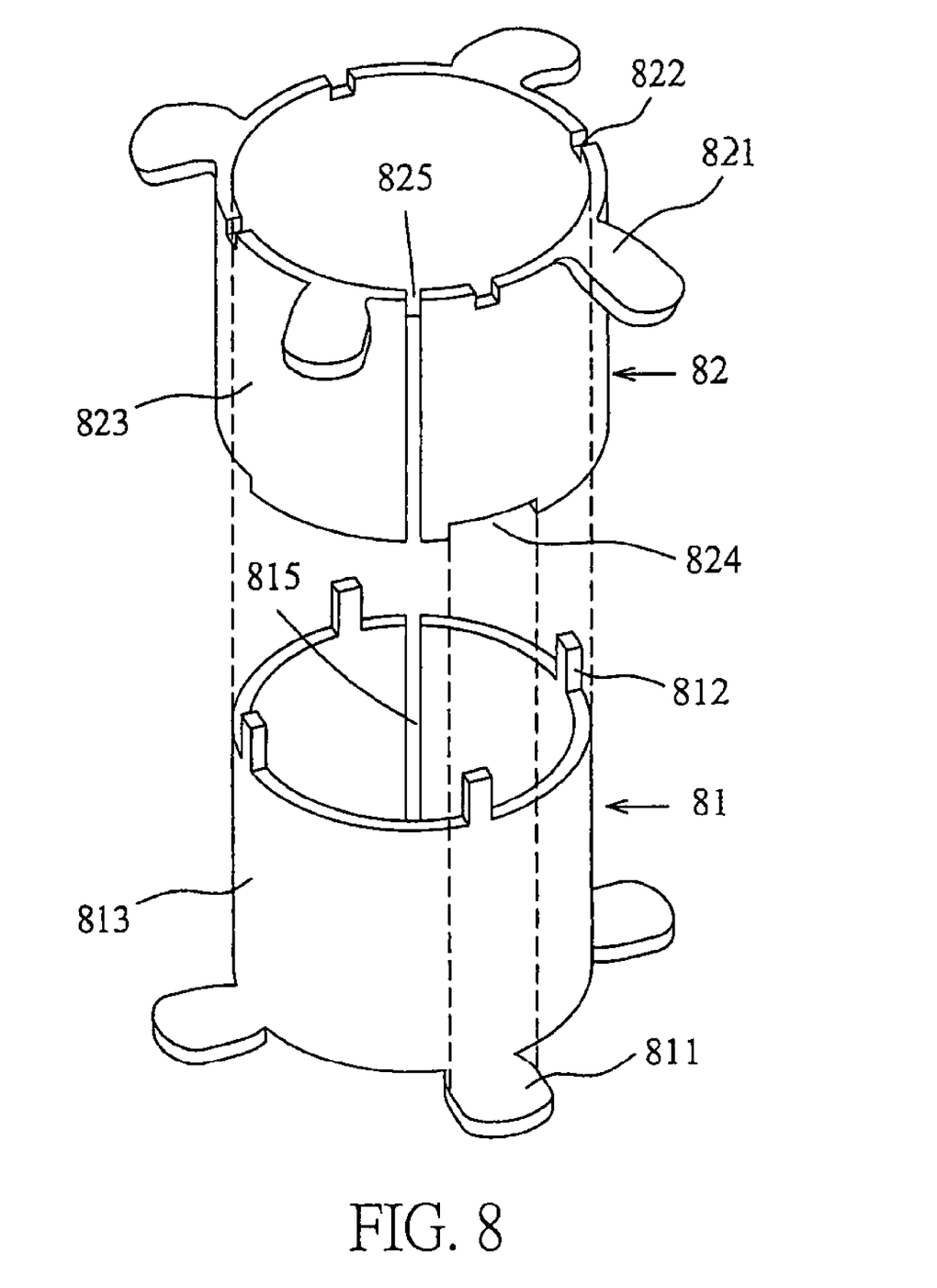
FIG. 8 is a perspective exploded view of a stator structure of a seventh embodiment of the present invention.

FIG. 8 shows a seventh embodiment of a stator structure of the invention. The stator structure includes a first stator part 81 and a second stator part 82, and the waist post 813 of the first stator part 81 is telescoped into that of the second stator part 82. The first and second stator parts 81 and 82 are formed by a single silicon piece, respectively. A plurality of salients 811 is disposed at the lower fringe of the first stator part 81, and a plurality of projections 812 is formed on an opposite fringe. A plurality of salients 821 and a plurality of notches 822 are alternatively disposed at upper fringe of the second stator part 82. The notches 822 correspond to the projections 812 of the first stator part 81. A plurality of receiving portions 824 is formed at the lower fringe of the second stator part 82. When the first stator part 81 is assembled with the second stator part 82, the waist post 813 of the first stator part 81 is disposed inside another waist post 823 of the second stator part 82 to form a multi-layer waist post. The salients 811 enter the receiving portions 824, and the projections 812 are bent outward and engaged with the notches 822. Furthermore, the first and second stator parts 81 and 82 have gaps 815 and 825 extending parallel to the axial direction of the waist post for preventing eddy current loss. Further, a coil can be wound around the stator structure of FIG. 8, as similar to FIG. 2B.

As mentioned above, the parts of the stator structure are made of the same material (e.g. silicon steel) so that they can be assembled in accurate positions without requiring any other positioning elements such as conventional bobbins. This can effectively reduce the accumulations of dimensional tolerances for the assembled stator structure. Also, manufacturing and assembling the stator structure become convenient and fast. Furthermore, the conventional processes of producing the stator structure, including machining magnetic bars of iron by turning operations to produce stator parts and then fitting them in with bobbins by forcing them, are not used. Rather, the upper, lower and middle stator parts of the stator structure are single pieces made of the same material. Thus, the stator structure can create a good magnetic loop. Furthermore, the middle stator part has an axial gap to avoid eddy current losses. Furthermore, the stator parts can be produced by a common mold, thereby significantly reducing the manufacturing cost and simplifying the manufacturing processes.

While the invention has been described by way of example and in terms of preferred embodiments, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A stator structure, comprising:

at least one stator part having a single rolled silicon steel sheet as a waist post with a gap, and a plurality of projections formed on two opposite ends thereof; and another two stator parts, each having an opening with a plurality of notches formed on an inner surface thereof;

wherein a coil is directly wound and extends axially around the waist post, the projections pass through the notches and are securely fit with the notches, respectively.

2. The stator structure as claimed in claim 1, further comprising a plurality of stator parts of the same material, coupled to each other to form the waist post.

3. The stator structure as claimed in claim 2, wherein each stator part has at least one recess and at least one protrusion to be assembled with another stator parts, respectively.

4. The stator structure as claimed in claim 2, wherein each of the plurality of stator parts is formed by a single silicon steel piece.

5. The stator structure as claimed in claim 4, wherein the plurality of stator parts are telescoped together to form a multi-layer waist post.

6. The stator structure as claimed in claim 5, wherein the plurality of stator parts include a first stator part and a second stator part, the first stator part having a plurality of receiving portions and the second stator part having a plurality of salients, wherein when the first stator part is assembled with the second stator part, the salients are coupled to the receiving portions.

7. The stator structure as claimed in claim 1, wherein the stator part has a plurality of convexities formed on the waist post and corresponds to the notches.

8. The stator structure as claimed in claim 7, wherein each of the another two stator parts is constructed by one or more silicon steel pieces stacked together.

9. The stator structure as claimed in claim 8, wherein after the plurality of projections pass through the notches, the projections are bent outward.

10. The stator structure as claimed in claim 1, wherein the plurality of stator parts have a plurality of salients extending radially outward from the waist post.

11. A stator structure, comprising:

a first stator part having a first connecting portion;

a second stator part having a second connecting portion;

a plurality of projections formed on two opposite ends of the first stator part and the second stator part; and another two stator parts, each having an opening with a plurality of notches formed on an inner surface thereof;

wherein the first and second stator parts have the same shapes and are of the same material, the first connecting portion contacts the second connecting portion, and the first connecting portion is coupled with the second connecting portion to form a waist post of the stator structure for allowing a coil to be directly wound and to extend axially thereon, and the projections pass through the notches and are securely fit with the notches, respectively.

12. A stator structure, comprising:

a first stator part having a single rolled silicon steel sheet with a waist post, and having a plurality of projections formed on two opposite ends thereof; and a second stator part having a silicon steel piece to be assembled with an end of the first stator part, and having an opening with a plurality of notches formed on an inner surface of the opening;

wherein a coil is directly wound and extends axially around the waist post, the projections pass through the notches and are securely fit with the notches, respectively.

13. The stator structure as claimed in claim 12, wherein after the plurality of projections pass through the plurality of notches, the projections are bent outward, and the first and second stator parts have a plurality of salients extending radially outward from the waist post.

14. The stator structure as claimed in claim 12, wherein the first stator part has a plurality of convexities formed on the waist post, and the convexities correspond to the notches.

15. A stator structure, comprising:

a first stator part having a single rolled silicon steel sheet;

a second stator part having another single rolled silicon steel sheet;

a plurality of projections formed on two opposite ends of the first stator part and the second stator part; and another two stator parts, each having an opening with a plurality of notches formed on an inner surface thereof;

wherein the first and second stator parts are assembled with each other to form a waist post; a coil is directly wound and extends axially around the waist post, and the projections pass through the notches and are securely fit with the notches, respectively.

* * * * *